Aug. 7, 1962 R. L. HORTON 3,048,715

BISTABLE MULTIAR

Filed June 27, 1960 2 Sheets-Sheet 1

INVENTOR

Rodney L. Horton

BY Sughrue, Rothwell, Mion & Zinn

ATTORNEYS

BISTABLE MULTIAR

Filed June 27, 1960 2 Sheets-Sheet 2

United States Patent Office 3,048,715

Patented Aug. 7, 1962

3,048,715

BISTABLE MULTIAR

Rodney L. Horton, Langhorn, Pa., assignor to International Business Machines Corporation, New York, N.Y., a corporation of New York Filed June 27, 1960, Ser. No. 39,100
8 Claims. (Cl. 307—88.5)

This invention relates to multiar circuits and more particularly to a multiar circuit for detecting the level of alternately positive and negative voltage ramps.

In many systems requiring analog-digital sensing and in systems utilizing level detection memory characteristics it is necessary to provide a circuit which produces an indication when a given input voltage has exceeded a positive or a negative reference voltage level. In the prior art, circuits called multiars have been provided which produce an output only when the input to the multiar exceeds a certain reference voltage. In many applications it is necessary to provide an output when the input voltage has become more positive than a positive reference level and a different output when the input has become more negative than the negative reference level. The prior art has solved this problem by providing a positive multiar which is triggered when the input voltage exceeds the positive reference level and a negative multiar which is triggered when the input voltage exceeds the negative reference level. The outputs of both of these multiars are connected to a bistable device which is triggered to one condition when the positive multiar produces an output and to the other state when the negative multiar produces an output. Such circuits are not completely satisfactory since the multiars produce redundant output pulses. That is, the multiars are triggered each time the input exceeds the given reference level. It is desirable that the level detection circuit produce an output only the first time that the input voltage exceeds one reference level and that the circuit not produce another output until the input voltage exceeds the opposite reference level.

Further, designs using separate positive and negative multiars controlling a bistable device have the disadvantage that they use an unnecessarily large number of components.

Accordingly, it is an object of the present invention to provide improved bistable multiar capable of detecting the level of alternately positive and negative voltage inputs.

It is a further object of the present invention to provide an improved circuit which will produce a single output when an input voltage exceeds a positive reference voltage and will not produce another output until the input exceeds a negative reference voltage.

It is a further object of the present invention to provide an improved bistable multiar device using a minimum number of components.

Figure 1:
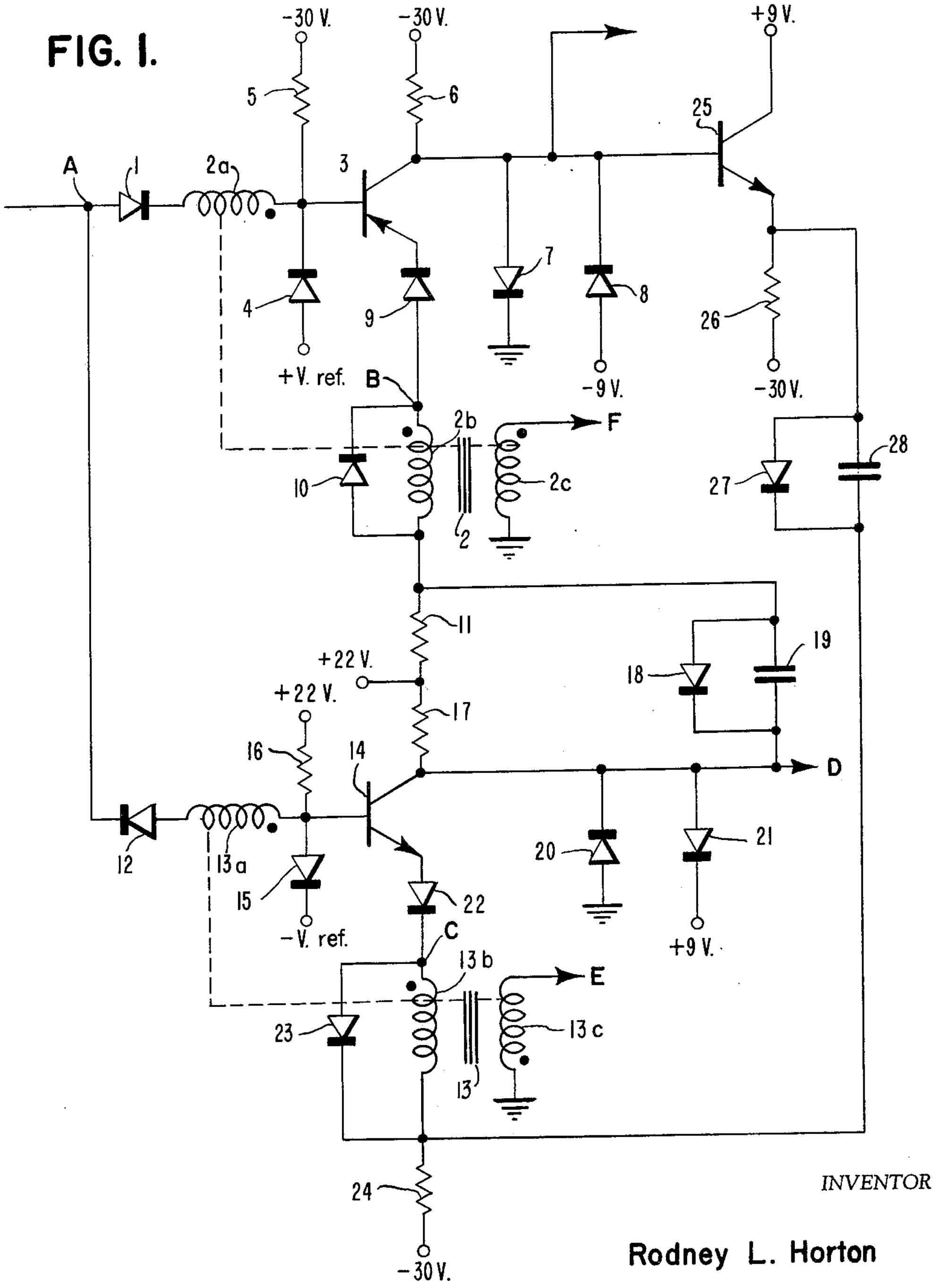

Further objects and advantages of this invention will become more apparent from the following description and appended claims taken in conjunction with the drawings in which:

FIG. 1 is a circuit diagram of the bistable multiar of the present invention; and FIG. 2*a* shows the input wave form.

FIG. 2*b* shows the voltage wave form at point B on the winding of transformer 2.

FIG. 2*c* shows the voltage wave form at point C on the transformer winding 13*b*.

FIG. 2*d* shows the voltage wave form at point D on the collector of transistor 14.

FIG. 2*e* shows the voltage wave form at the point E on the transformer winding 13*c*.

FIG. 2*f* shows the voltage wave form at the point F on the transformer winding 2*c*.

In accordance with one embodiment of the invention the input voltage is connected through two parallel diodes and the windings of two regenerative pulse transformers to the respective bases of two complementary transistors. One diode, transformer, transistor combination forms the positive multiar which will be triggered only when the input voltage exceeds a positive reference voltage. The positive reference voltage biases the input diode so that current flows through the transformer winding only when the input exceeds the positive reference voltage. The transformer, a second winding of which is connected in the emitter circuit of the transistor, provides regeneration thus cutting off the transistor.

The second input diode, regenerative transformer and transistor are similarly connected to form the negative multiar which will be triggered when the input voltage becomes more negative than the negative reference level. The collector of the second transistor is connected back to the emitter of the first transistor so that when the second transistor is cut off the first transistor will be rendered conducting. The collector of the first transistor is connected through an emitter follower circuit to the emitter of the second transistor so that the second transistor will be rendered conducting when the first transistor is cut off.

Numerous outputs from the circuit are provided. D.C. outputs can be taken from the collectors of either of the transistors. These outputs provide an indication of whether the last voltage to exceed one of the reference levels was in excess of the positive reference level or the negative level. Also, the provision of an extra winding on each of the regenerative transformers provides pulse outputs which are present when the input voltage exceeds the positive or the negative reference levels.

Referring now to FIG. 1, the input voltage is connected through a diode 1 and a winding 2*a* of a transformer 2 to the base of a transistor 3. The diode 1 is normally back biased by the positive reference voltage, $+V_{ref}$, which is applied to the anode of a diode 4. A negative voltage source, shown as being —30 volts, is also connected to the base of transistor 3 through a resistor 5. Collector voltage for the transistor 3 is provided by the —30 volt supply connected through resistor 6 to the collector of transistor 3. Diodes 7 and 8 serve as positive and negative clamps for the collector of transistor 3, the diode 7 clamping the collector voltage at ground and the diode 8 clamping the collector voltage at —9 volts.

In the emitter circuit of the transistor 3 a second winding 2*b* of the transformer 2 is connected through an isolating diode 9 to the emitter of transistor 3. A diode 10 is connected in parallel with the winding 2*b* in order to damp out the ringing of the transformer when there is regeneration. The other end of transformer winding 2*b* is connected through resistor 11 to the emitter voltage, shown as being +22 volts. In order to produce a pulse output when the multiar is triggered, the transformer 2 is provided with a third winding 2*c*.

In a similar manner the input voltage is connected through a diode 12, and one winding 13*a* of a transformer 13, to the base of a second transistor 14. The negative reference voltage, $-V_{ref}$, is also connected through a diode 15 to the base of transistor 14. The base voltage, shown as being +22 volts, is applied to the base of transistor 14 through a resistor 16.

The collector voltage of +22 volts, is applied to the collector of transistor 14 through resistor 17. In order to clamp the collector between ground and +9 volts, a diode 20 is connected between the collector and ground and a diode 21 is connected between the collector and +9 volts. The collector of transistor 14 is also connected to the emitter of the first transistor 3 for coupling purposes. A diode 18, bypassed by a capacitor 19, provides the coupling between the collector of the second transistor 15 and one end of winding 2*b* which in turn is connected to the emitter of the first transistor 3.

In the emitter circuit of transistor 14, the isolating diode 22 is connected directly to the emitter and to a winding 13*b* of transformer 13. Winding 13*b* is shunted by diode 23 in order to damp out the ringing of the transformer when the circuit is regenerating. Emitter voltage, −30 volts, is applied through resistor 24 to the winding 13*b*.

In order to provide coupling between the collector of the first transistor 3 and the emitter of the second transistor 14, an emitter follower transistor 25 is provided. This emitter follower transistor provides emitter current to second transistor 14 so that transistor 14 is turned on when the first transistor 3 is turned off. The collector of the first transistor 3 is connected directly to the base of emitter follower transistor 25. The collector of transistor 25 is connected to +9 volts and the emitter voltage, −30 volts, is provided through a resistor 26. The emitter of transistor 25 is connected to transistor 14 through an isolating diode 27 which is shunted by a capacitor 28. The capacitor 28 effectively bypasses resistor 24 to ground when the emitter follower 22 is conducting and also serves as a speed-up capacitor when the circuit is switched. Diode 27 is connected to the winding 13*b* which is connected in turn to the emitter of second transistor 14 so that when transistor 3 is cut off, resulting in emitter follower 22 being cut off, the emitter potential of transistor 14 will drop and the transistor will conduct.

Figure 2:
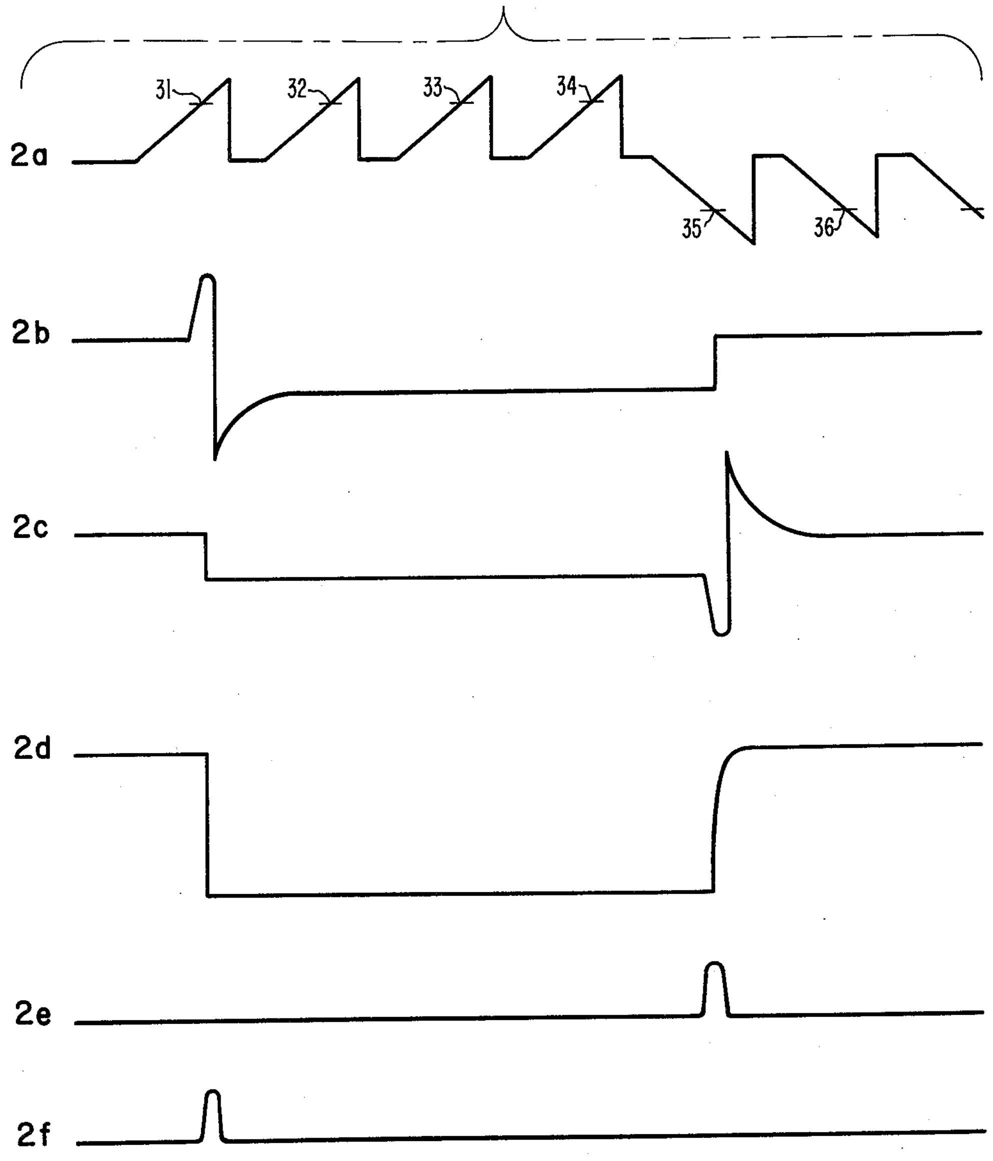

The operation of the bistable multiar circuit of FIG. 1 can best be described with reference to the wave forms of FIG. 2. The input diode 1 is normally back biased by the positive reference voltage $+V_{ref}$. However, when the input, shown in FIG. 2*a*, goes more positive than the voltage $+V_{ref}$ as shown at the point 31, current flows through the transformer. The voltage at the point B at the junction of diode 9 and transformer winding 2*b*, shown in FIG. 2*b*, goes positive and then negative as the transformer 2 regenerates the turnoff action of the first transistor 3. When the first transistor 3 is cut off its collector voltage goes negative thus cutting off emitter follower 25 which in turn causes point C, at the junction of transformer winding 13*b* and diode 20, to go negative thus providing emitter current for transistor 14 and turning that transistor on. Voltage on the collector of the second transistor 14 immediately falls to a negative level as shown in FIG. 2*b*.

As the first transistor 3 regenerates through the transformer 2 a pulse is produced by the transformer winding 2*c* as shown in FIG. 2*f*.

The next time that the input voltage exceeds the positive reference level, indicated at 32 in FIG. 2*a*, there will be no switching as the first transistor is already cut off. Similarly, the multiar will not switch at the points 33 and 34 in FIG. 2*a*. However, as the input wave form goes below the negative reference level, as indicated at the point 35 in FIG. 2*a*, the circuit will switch.

The circuit conditions existing before this switching occurs are as follows: Diode 15 and resistor 16 provide a constant base potential for transistor 14. With transistor 14 conducting the collector current is of sufficient magnitude to flow in resistor 17, resistor 11, diode 18 and diode 20. The clamping action of the diode 20 keeps transistor 14 out of saturation for reference voltages of interest. Transistor 3 is not conducting. The base of emitter follower transistor 25 is clamped at −9 volts and since diode 27 provides D.C. isolation of emitter follower transistor 25 from transistor 14 when the emitter of transistor 14 is more positive than the emitter of transistor 25, transistor 14 is conducting. The D.C. potential at the emitter of transistor 25 is an effective ground and permits capacitor 28 to bypass resistor 24.

A negative ramp going through $-V_{ref}$ as at point 35 in FIG. 2*a* closes diode 12 turning transistor 14 off through the regenerative action of transformer 13. The rising collector wave form of transistor 14 turns transistor 3 on.

The voltage developed across resistor 6 in the collector circuit of transistor 3 is coupled through the emitter follower transistor 25 and the diode 27 to the emitter of transistor 14 thus turning that transistor on.

When transistor 14 conducts its collector current must be sufficiently larger than the emitter current of transistor 3 when transistor 3 conducts so that transistor 3 will be reverse biased. The difference in emitter currents requires that transformers 2 and 13 have different magnetizing inductance if equal amplitude pulses are desired from each stage.

The width of the pulses is dependent upon magnetizing inductance and will, in general, increase as pulse amplitude is increased by increasing the magnetizing inductance. Nearly identical pulses can be obtained by capacitive loading of the narrower pulse after the emitter currents have been adjusted to give identical amplitudes.

While a specific embodiment of the invention has been shown and described, it will, of course, be understood that various other modifications may be made without departing from the principles of the invention. The appended claims are therefore intended to cover any such modifications within the true spirit and scope of the invention.

What I claim as new and desire to secure by a Letters Patent of the United States is:

1. A bistable multiar conditioned to one stable state by an input voltage which is more positive than a positive reference voltage and conditioned to a second stable state by an input voltage which is more negative than a negative reference voltage comprising first and second transistors of opposite conductivity types, the collector of said first transistor being coupled to the emitter of said second transistor and the collector of said second transistor being coupled to the emitter of said first transistor so that only one transistor can conduct at a time, said input voltage being connected to the bases of said first and said second transistors, a source of positive reference voltage, a source of negative reference voltage, said source of positive reference voltage being coupled to the base of said first transistor simultaneously as said source of negative reference voltage is coupled to the base of said second transistor, said first transistor being biased by said positive reference voltage so that said first transistor is turned off when said input voltage is more positive than said positive reference voltage, and said second transistor being biased by said negative reference voltage so that said second transistor is turned off when said input voltage is more negative than said negative reference voltage.

2. A bistable multiar conditioned to one stable state by an input voltage which is more positive than a positive reference voltage and conditioned to a second stable state by an input voltage which is more negative than a negative reference voltage comprising first and second transistors of opposite conductivity types, said transistors being emitter-to-collector coupled so that only one transistor can conduct at a time, a first regenerative transformer having two windings, a first input diode, said input voltage being connected to said first input diode, said first input diode being reverse biased by said positive reference voltage, one winding of said regenerative transformer being connected between said input diode and the base of said first transistor, the other winding of said regenerative transformer being connected to the emitter of said first transistor, said windings of said regenerative transformer having a polarity such that said first transistor is regeneratively cut off when said input voltage becomes more positive than said positive reference potential, a second regenerative transformer having two windings, a second input diode, said input voltage being connected to said second input diode, said second input diode being reverse biased by said negative reference voltage, one winding of said second regenerative transformer being connected between said second input diode and the base of said second transistor, the other winding of said second regenerative transformer being connected to the emitter of said second transistor, said windings of said second regenerative transformer having a polarity such that said second transistor is regeneratively cut off when said input voltage becomes more negative than said negative reference voltage.

3. The bistable multiar recited in claim 2 wherein said first regenerative transformer has a third winding which produces a pulse output when said first transistor is cut off and said second regenerative transformer has a third winding which produces a pulse output when said second transistor is cut off.

4. A bistable multiar conditioned to one stable state by an input voltage which is more positive than a positive reference voltage and conditioned to a second stable state by an input voltage which is more negative than a negative reference voltage comprising first and second transistors of opposite conductivity types, said first transistor being biased by said positive reference voltage so that said first transistor is turned off when said input voltage exceeds said positive reference voltage, said second transistor being biased by said negative reference voltage so that said second transistor is turned off when said input voltage exceeds said positive reference voltage, the collector of said second transistor being connected to the emitter of said first transistor so that said first transistor is turned on when said second transistor is turned off, and a third transistor connected in an emitter follower configuration, the collector of said first transistor being connected to the base of said third transistor, the emitter of said third transistor being connected to the emitter of said second transistor so that said second transistor is turned on when said first transistor is turned off.

5. A bistable multiar conditioned to one stable state by an input voltage which is more positive than a positive reference voltage and conditioned to a second stable state by an input voltage which is more negative than a negative reference voltage comprising first and second transistors of opposite conductivity types, said first transistor being biased by said positive reference voltage so that said first transistor is turned off when said input voltage exceeds said positive reference voltage, said second transistor being biased by said negative reference voltage so that said second transistor is turned off when said input voltage is more negative than said negative reference voltage, a first diode connected to the emitter of said first transistor, the collector of said second transistor being connected to the other terminal of said first diode, said diode having a polarity such that said diode is forward biased when said second transistor is turned off whereby emitter current is provided to said first transistor when said second transistor is cut off, a third transistor connected in an emitter follower configuration, the collector of said first transistor being connected to the base of said third transistor, a second diode connected to the emitter of said third transistor, the other terminal of said second diode being connected to the emitter of said third transistor, said diode having a polarity such that said diode is forward biased and emitter current is provided to said second transistor when said first transistor is cut off.

6. A bistable multiar conditioned to one stable state by an input voltage which is more positive than a positive reference voltage and conditioned to a second stable state by an input voltage which is more negative than a negative reference voltage comprising first and second transistors of opposite conductivity types, a first regenerative transformer having two windings, a first input diode, said input voltage being connected to said first input diode, said first input diode being reverse biased by said positive reference voltage, one winding of said regenerative transformer being connected between said input diode and the base of said first transistor, the other winding of said regenerative transformer being connected to the emitter of said first transistor, said windings of said first regenerative transformer having a polarity such that said first transistor is regeneratively cut off when said input voltage becomes more positive than said positive reference voltage, a second regenerative transformer having two windings, a second input diode, said input voltage being connected to said second input diode, said second input diode being reverse biased by said negative reference voltage, one winding of said second regenerative transformer being connected between said input diode and the base of said second transistor, the other winding of said regenerative transformer being connected to the emitter of said second transistor, said windings of said second regenerative transformer having a polarity such that said second transistor is regeneratively cut off when said input voltage becomes more negative than said negative reference potential, the collector of said second transistor being connected to the emitter of said first transistor so that said first transistor is turned on when said second transistor is turned off and a third transistor connected in an emitter follower configuration, the collector of said first transistor being connected to the base of said third transistor, the emitter of said third transistor being connected to the emitter of said second transistor so that said second transistor is turned on when said first transistor is turned off.

7. The bistable multiar recited in claim 6 wherein said first regenerative transformer has a third winding which produces a pulse output when said first transistor is regeneratively cut off and said second regenerative transformer has a third winding which produces a pulse output when said second transistor is regeneratively cut off.

8. The bistable multiar recited in claim 6 and a third diode connected to the emitter of said first transistor, said collector of said second transistor being connected to the emitter of said first transistor through said third diode, said third diode having a polarity such that said diode is forward biased when said second transistor is cut off, and a fourth diode connected to the emitter of said second transistor, the emitter of said emitter follower transistor being connected to the emitter of said second transistor through said fourth diode, said fourth diode having a polarity such that it is forward biased when said first transistor is cut off.

References Cited in the file of this patent

UNITED STATES PATENTS 2,938,174 Bulleyment ------------- May 24, 1960